3,320,337
TRANSESTERIFICATION OF PHOSPHITES
Charles F. Baranauckas and Irving Gordon, Niagara Falls,
N.Y., assignors to Hooker Chemical Corporation,
Niagara Falls, N.Y., a corporation of New York
No Drawing. Filed Feb. 17, 1964, Ser. No. 345,088
3 Claims. (Cl. 260—982)

This invention relates to novel esters of phosphorus. More particularly this invention relates to primary, secondary and tertiary phosphites having from two to about six hydroxyls per molecule.

In accordance with this invention esters of phosphorus have been prepared having the formulas:

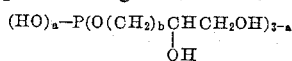

and

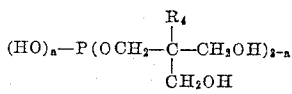

where $a$ is selected from 0 to 2, $b$ is from 1 to 10 and $R_4$ is lower alkyl. It is to be understood that $a$ and $b$ above may be integers and $R_4$ may have from 1 to 4 carbons.

The products of the invention may be prepared by reacting a teritary phosphite with a triol to form a triester of phosphorous acid having free hydroxyls. The corresponding mono- and di-esters of phosphorous acid esters may be formed by hydrolyses of the triester. Hydrolysis of the triester may be effected by the addition of an acid, such as hydrochloric acid, to the phosphite formed or by other convenient means, as set forth at page 188 of the standard text Organophosphorus Compounds (1950), by Kosolapoff, published by John Wiley & Sons, Inc., New York, N.Y.

The novel phosphorus ester products of the present invention are particularly useful phosphorus-containing chemicals and will undergo many reactions with other poly-functional materials. They readily react with polyisocyanates, e.g., toluene diisocyanate or polymethylene polyphenyl isocyanate, to form foamed polyurethanes which are flame resistant and have improved heat distortion temperatures. They also are useful as antioxidants in polyolefins, e.g., polypropylene. These esters may also be utilized as stabilizers in polyvinyl chloride and copolymers of vinyl chloride with minor amounts of other materials such as vinyl acetate, acrylonitrile and so forth. Further, the invented compounds may be utilized in polyolefins, such as polypropylene, polyethylene, mixed lower alkylene polymers, e.g., ethylene propylene terpolymer, and so forth, to improve the dyeing chracteristics of fabrics produced from these plastics. The products of this invention are also useful as chemical intermediates in the preparation of phosphonates.

The process of this invention may be illustrated by the following equations:

(a)
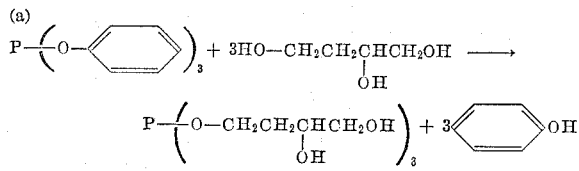

(b)
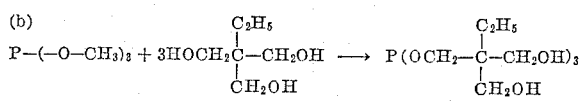

Hydrolysis yields the corresponding mono- and diesters of phosphorous acid.

(c), (d)
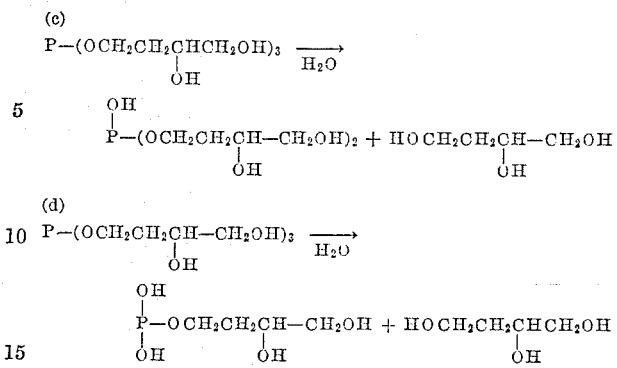

Among the many tertiary phosphites (triesters of phosphorous acid) reactants which may be employed to make the invented products are triphenyl phosphite, tris(O-cresyl)phosphite, tris(4-chlorophenyl)phosphite, tris(betachloroisopropyl)phosphite, tris(3 - bromophenyl) phosphite, tris(xylenyl)phosphite, tris(alpha napthyl) phosphite, diphenyldecyl phosphite, phenyldidecyl phosphite, trimethyl phosphite, tridecyl phosphite, tris(octadecyl)phosphite, tris(cyclohexyl)phosphite, triallyl phospite, trimethallyl phosphite, tributyl phosphite, phenyldiisobutyl phosphite, trilauryl phosphite and tris(betanaphthyl)phosphite.

It is thus seen that a tertiary phosphite having the formula $P(OR')_3$ where R is selected from the group consisting of alkyl having from one to about 20 carbons, alkenyl having from 1 to about 20 carbons, aryl having from 6 to about 24 carbons, aralkyl having from 7 to about 24 carbons, substituted alkenyl having from 1 to about 20 carbons, substituted aryl having from 6 to about 24 carbons and substituted aralkyl having from 7 to about 24 carbons, where said substituent, if any, is inert to or does not adversely effect the conditions of reaction, may be utilized in the practice of the invention.

Examples of triols that may be utilized are the aliphatic, usually hydrocarbyl triols, preferably trimethylol alkanes, such as, trimethylol methane, trimethylol ethane, trimethylol propane, trimethylol butane, glycerine, 2,8-dihydroxy-octanol-1, and 2,12-dihydroxy dodecanol-1. Polymers of trimethylol alkanes also may be utilized in the process of this invention. When polymers such as Pluracol TPE 4542 Triol (a propylene oxide adduct of trimethylol propane terminated with ethylene oxide, having an average molecular weight of 4500), trimethylolpropane propylene oxide adduct with molecular weight of 1700, Pluracol TP–340 Triol (a polyether triol prepared from trimethylolpropane and propylene oxide having a molecular weight of about 340), Pluracol TP–440 Triol (a polyether triol prepared from trimethylol propane and propylene oxide, molecular weight about 440), and so forth, are utilized, the hydroxyl number of the phosphite produced will be from 200 to about 900.

In the present invention it has been found that the desired novel phosphites are formed by reacting about 3 molar equivalents of triol per mole of tertiary phosphite. While this reaction is essentially stoichiometric, an excess of either reactant with respect to the other is tolerable.

The reaction of this invention may be carried out at atmospheric, sub-atmospheric or super-atmospheric pressures. Temperatures in the range of about 25 degrees centigrade to 300 degree centigrade are desirable, and temperatures of about 100 to 200 degrees centigrade are preferred.

The preparation of the products of the invention may be carried out without a catalyst. However, the utilization of a transesterification catalyst will accelerate the rate of reaction. Examples of these catalysts include: a metal alcoholate, phenolate or hydride, such as sodium methylate, lithium methylate, potassium methylate, sodium ethylate, sodium isopropylate, sodium phenolate, potassium phenolate, sodium cresylate, sodium hydride, sodium metal, lithium metal, sodium hydroxide, diesters of phosphorous acid, and so forth. It is preferred that the basic tranesterification catalyst utilized have a pH of at least 7.5 in a 0.1 normal solution to be utilized in the reaction. The transesterification catalyst when utilized, is used in distinctly catalytic proportions, e.g., from 0.001 to 0.20 mole, preferably from 0.001 to 0.05 mole per mole of triorganic phosphite reactant.

The following examples illustrate the invention, but are not intended to limit it in any manner. All parts are by weight and temperatures are in degrees centigrade unless otherwise indicated.

*Example 1*

Tris(betachloroisopropyl)phosphite (5 moles, 1558 parts), trimethylol propane (15 moles, 2013 parts) and sodium hydride (1.5 parts) were charged to a reaction vessel and transesterification was effected over a period of four and one-half hours at a temperature of about 120 degrees centigrade. The product formed had the following structure:

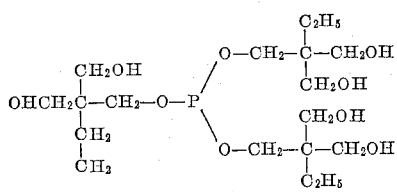

Tris-(trimethylol propane)phosphite

*Example 2*

The product of Example 1 was then refluxed at temperatures from 150 to about 175 degrees centigrade until there was obtained a negligible iodine titer. Volatiles were distilled off at about 100 degrees centigrade under a pressure of 15 millimeters of mercury. A product was obtained having the following structure:

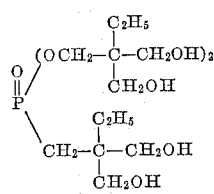

Tris(trimethylol propane)phosphonate

A sample of the product, which was viscous and yellow in appearance, was submitted to infrared analysis. This analysis indicated the presence of the structures of Examples 1 and 2. The product analyzed 5.5 percent phosphorus.

*Example 3*

The product of Example 1 when hydrolyzed with hydrochloric acid yields the corresponding primary and secondary phosphites.

*Example 4*

Following the procedure of Example 1 when one mole of tributyl phosphite is reacted with three moles of 7,8-dihydroxy-octanol-1, octanol, the product formed is tris (7,8-dihydroxyoctyl)phosphite.

*Example 5*

Hydrolysis of tris (7,8-dihydroxyoctyl)phosphite with hydrochloric acid will yield its corresponding primary and secondary phosphite.

*Example 6*

Triphenyl phosphite (3 moles, 930 parts) and trimethylol propane (9 moles, 1208 parts) were charged to a reaction vessel and transesterified for a period of about 1 hour at about 115 degrees centigrade. The product formed had a structure similar to the product of Example 1.

*Example 7*

The product of Example 6 was heated for 4 hours at a temperature of from about 180 to 210 degrees centigrade to effect isomerization (rearrangement). The volatiles were removed in the manner set forth in Example 2. A compound having a structure similar to the compound of Example 2 was formed. Infrared analysis of a sample of the product confirmed the presence of compounds of the structures of Examples 6 and 7.

*Example 8*

A portion of the product formed in Example 7 was mixed with excess epichlorohydrin (1500 milliliters) and the mixture refluxed at about 120 degrees centigrade for about 2 hours. The volatiles were then removed at ultimate conditions of about 130 degrees centigrade under 3 millimeters of mercury absolute. The product had the following analysis:

Hydroxyl number—562
Percent phosphorus—5.6
Gardner viscosity—76 seconds at 50 degrees centigrade The analysis also confirms the presence of the structures of Examples 6 and 7.

*Example 9*

Following the procedure of Example 1 tris(chloroethyl)phosphite (7 moles, 1887 parts), trimethylol propane (21 moles, 2818 parts) and sodium hydride (4.2 parts) were reacted and a product similar to the product of Example 1 was obtained.

*Example 10*

The product of Example 9 was reacted following the procedure of Example 2 and a product similar to the product of Example 2 was recovered, indicating that the product of Example 9 was tris(trimethylol propane) phosphite and that it had utility as a chemical intermediate.

We claim:

1. A process for preparing a tertiary phosphite selected from the group consisting of

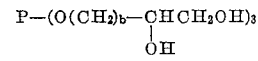

and

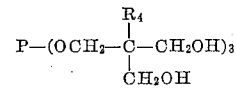

wherein $b$ is an integer between 1 and 10 inclusive and $R_4$ is lower alkyl, which comprises reacting at a temperature in the range of about 25 degrees centigrate to 300 degree centigrade, about 1 mole of a tertiary phosphite having the formula $P(OR')_3$, wherein $R'$ is selected from the group consisting of alkyl, alkenyl, aryl and arylalkyl, with about three moles of a triol, and recovering the tertiary phosphite.

2. A process in accordance with claim 1 wherein the reaction is conducted at a temperature in the range of 100 degrees centigrate to 200 degrees centigrade in the presence of a basic catalyst selected from the group consisting of alkali metal alcoholate, alkali metal phenolate, alkali metal hydride and diesters of phosphorous acid.

3. A process in accordance with claim 2 wherein the triol is trimethylol propane.

References Cited by the Examiner

UNITED STATES PATENTS 3,056,824 10/1962 Hecker et al. _____ 260—461
3,096,345 7/1963 Hechenbleikner et al.
                                               260—461 X

OTHER REFERENCES

Kosolapoff, "Organo-Phosphorus Compounds," John Wiley and Sons, New York, N.Y. (1950), p. 188.

CHARLES B. PARKER, *Primary Examiner.*

FRANK SIKORA, RICHARD L. RAYMOND,
*Assistant Examiners.*

UNITED STATES PATENT OFFICE
CERTIFICATE OF CORRECTION

Patent No. 3,320,337                          May 16, 1967

Charles F. Baranauckas et al.

It is hereby certified that error appears in the above numbered patent requiring correction and that the said Letters Patent should read as corrected below.

Column 1, line 27, for "teritary" read -- tertiary --; line 53, for "chracteristics" read -- characteristics --; same column 1, lines 67 to 70, the formula should appear as shown below instead of as in the patent:

(b)
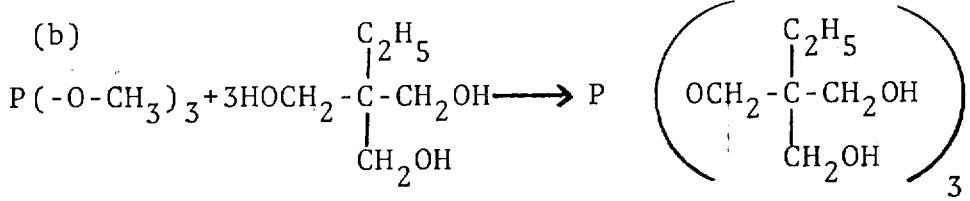

column 2, line 34, after "carbons," insert -- substituted alkyl having from 1 to about 20 carbons, --; line 66, for "degree" read -- degrees --; column 3, lines 6 and 7, for "tranesterification" read -- transesterification --; column 4, line 64, for "centigrate" read --centigrade --; line 65, for "degree" read -- degrees --; same column 4, line 72, for "centigrate" read -- centigrade --.

Signed and sealed this 26th day of November 1968.

(SEAL)
Attest:

EDWARD M. FLETCHER, JR.                    EDWARD J. BRENNER
Attesting Officer                                Commissioner of Patents